United States Patent [19]
Economikos et al.

[11] Patent Number: 5,491,319
[45] Date of Patent: Feb. 13, 1996

[54] LASER ABLATION APPARATUS AND METHOD

[75] Inventors: Laertis Economikos; Robert Hannon, both of Wappingers Falls; Richard P. Surprenant, Poughkeepsie, all of N.Y.

[73] Assignee: International Business Machines Corporation, Armonk, N.Y.

[21] Appl. No.: 359,228

[22] Filed: Dec. 19, 1994

[51] Int. Cl.⁶ .................................................. B23K 26/06
[52] U.S. Cl. ............................... 219/121.69; 219/121.68; 219/121.83; 219/121.73; 359/230
[58] Field of Search ........................ 219/121.6, 121.68, 219/121.69, 121.73, 121.74, 121.75, 121.83, 121.85; 216/65, 66, 94; 359/227, 230, 231, 233, 232; 358/297; 606/17; 356/121, 122, 388, 432

[56] References Cited

U.S. PATENT DOCUMENTS

| | | | |
|---|---|---|---|
| 2,929,871 | 3/1960 | Cross | 359/227 |
| 3,668,990 | 6/1972 | Hayes | 359/232 |
| 3,803,637 | 4/1974 | Martin et al. | 359/230 |
| 3,849,004 | 11/1974 | Cofek | 359/232 |
| 4,675,500 | 6/1987 | Kunz et al. | |
| 4,910,739 | 3/1990 | Sheng | |
| 4,940,508 | 7/1990 | Shamouilian et al. | |
| 5,219,344 | 6/1993 | Yoder, Jr. | |
| 5,284,477 | 2/1994 | Hanna et al. | 219/121.73 |

FOREIGN PATENT DOCUMENTS

| | | | |
|---|---|---|---|
| 60-44194 | 3/1985 | Japan | 219/121.68 |
| 4-262884 | 9/1992 | Japan | 219/121.68 |

*Primary Examiner*—Teresa J. Walberg
*Assistant Examiner*—Gregory L. Mills
*Attorney, Agent, or Firm*—Harold Huberfeld; Steven J. Soucar

[57] ABSTRACT

A laser ablation apparatus and method removes undesired portions of a workpiece. An industrial laser generates a beam of optical energy and directs the beam at the workpiece. A mechanism in the path of the beam for shapes the cross-section of the beam and includes first and second linear actuators on opposite sides of the beam path. Each of the actuators includes a plurality of linear members, with each linear member being adjacent to and in contact with another linear member, and means for individually inserting and retracting each of said members into and out of said beam path a desired distance to thereby shape the beam so as to ablate only undesired portions of the workpiece.

4 Claims, 2 Drawing Sheets

5,491,319

LASER ABLATION APPARATUS AND METHOD

FIELD OF THE INVENTION

This application relates to the processing of workpieces with a laser and more particularly to a laser ablation apparatus and method of using that apparatus.

BACKGROUND OF THE INVENTION

In the manufacture of microelectronic devices, multilayer ceramic substrates are frequently used to support several layers of thin film metallization patterned to define desired circuit interconnections. Occasionally manufacturing defects in the thin film metallization layers can cause electrical shorts or undesired circuit interconnections. Since such multilayer ceramic circuits are quite expensive to manufacture it is desirable to repair such defects. Typically such defects have been repaired by directing a high intensity laser beam at the defect. In order to ensure that the defect or undesired material is fully removed, such laser beams have been of sufficient diameter to extend beyond the area of the defect. The application of the beam beyond the area of the defect coupled with the difference in ablation rates between the thin film metallurgy and the dielectric material underlying the metallurgy may allow the laser energy to penetrate below the top surface further than desired. The resulting absorption of the beam below the desired level could result in damage to underlying thin film features in such a metallurgy structure. In addition the rate of laser ablation is highly dependent on the geometry of the features being processed. As a result, even if a uniform laser beam is utilized, some features will be removed faster than others. This factor can also result in damage to the aforementioned underlying thin film features. Accordingly, the inventors have recognized a need for an improved technique for correcting defects in thin film metallization patterns.

SUMMARY OF THE INVENTION

A laser ablation apparatus and method have been provided for removing undesired portions of a workpiece. An industrial laser is provided for generating a beam of optical energy and directing the beam at the workpiece. A mechanism is provided in the path of the beam for shaping the cross-section of the beam including first and second linear actuators on opposite sides of the beam path. Each of the actuators includes a plurality of linear members, with each linear member being adjacent to and in contact with another linear member, and means for individually inserting and retracting each of said members into and out of said beam path a desired distance to thereby shape the beam so as to ablate only undesired portions of the workpiece.

Accordingly a feature of the present invention is the provision of an apparatus and method for removing undesired portions of a workpiece without damaging adjacent or underlying portions of the workpiece.

Another feature of the present invention is the provision of an apparatus and method for removing undesired portions of a workpiece which can easily be adjusted during the removal process to avoid damaging adjacent or underlying portions of the workpiece.

Other advantages and novel features of the present invention will become apparent from the following detailed description of the invention when considered in conjunction with the accompanying drawings.

DESCRIPTION OF THE PREFERRED EMBODIMENT

Figure 1:
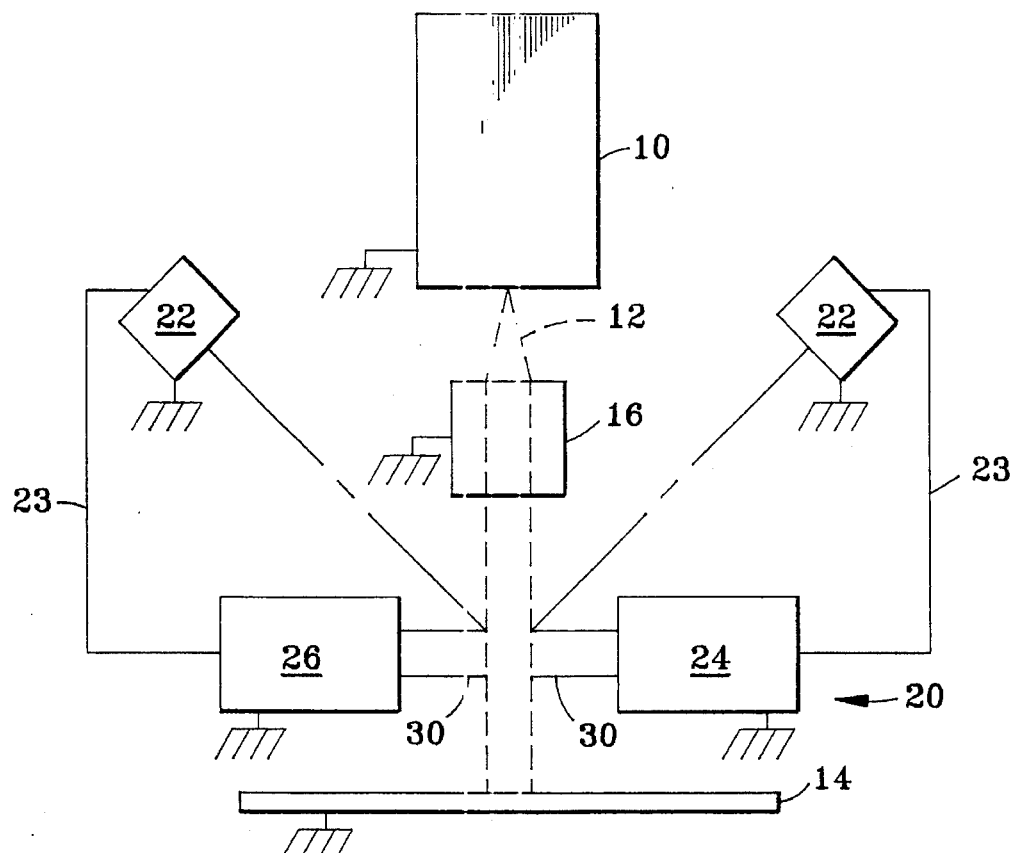
FIG. 1 shows a block and schematic drawing of the laser ablation apparatus of the present invention.
Figure 2A:
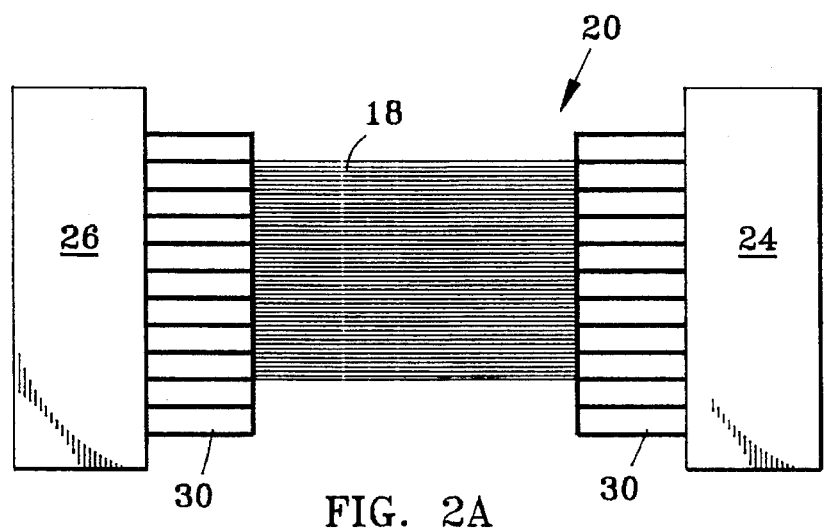
FIG. 2A–2D show a top view in schematic form of a fully opened shaping apparatus for use in the laser ablation apparatus shown in FIG. 1 and actuators therefor.
Figure 3:
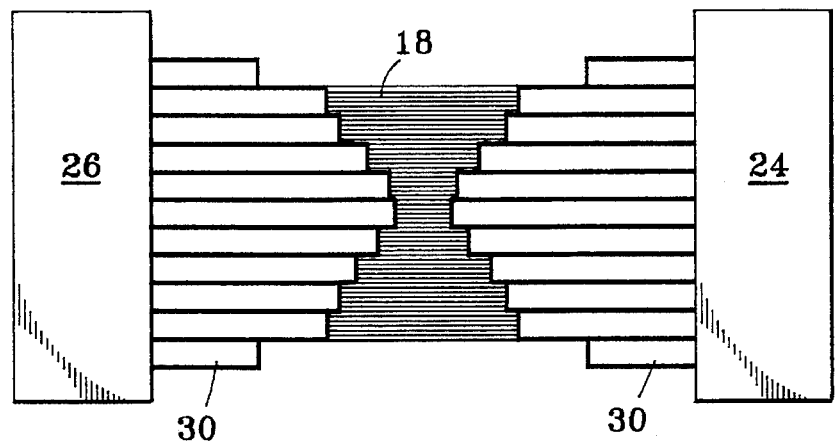
FIG. 3 shows the shaping apparatus of FIG. 2 in a partially closed position.

FIG. 1 shows the apparatus of the present invention. An industrial laser 10 generates a beam of optical energy 12 of sufficient intensity to ablate material on a workpiece 14 to which it is directed. The workpiece 14 is typically a multilayer ceramic substrate used in the manufacture of microelectronic devices and circuits. The beam 12 passes through a suitable optical assembly 16 to properly focus the beam on the desired portion of the workpiece 14. The optical assembly 12 may also include a mask to provide a preliminary shape, such as rectangle, to the cross section of the beam 12. The focussed beam 18 passes through an opening in a beam shaping apparatus 20 of the present invention which is positioned in the path of the focussed beam 18 for shaping the cross-section of the beam 18 to a desired configuration as shown in FIGS. 2A and 3. The apparatus 20 may also include a servo control 22, such as a video monitors having output signals 23, as further described in FIG. 3.

FIG. 2A shows the shaping apparatus 20 in greater detail. The apparatus 20 includes a pair of linear actuator assemblies 24 and 26 on opposite sides of the beam 18. Each of the actuators includes a plurality of linear members 30, for example eleven, with each linear member being adjacent to and in contact with at least one other linear member. The number of linear members 30 will determine the resolution of the beam shaping capability of the apparatus 20. The linear members 30 may either be circular cylinders or cylinders having a polygonal cross-section such as flat slats having a rectangular cross-section. The actuator assemblies 24 and 26 serve to individually insert and retract each of the members 30 into and out of the beam path 18 a desired distance to shape the beam 18 so as to remove only undesired portions of the workpiece 14. The members 30 are preferably inserted and retracted along a path perpendicular to the path of beam 18.

Figure 2B:
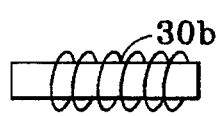
Figure 2C:
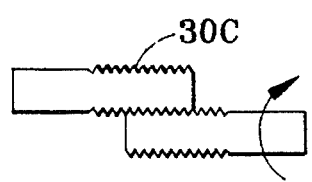
Figure 2D:
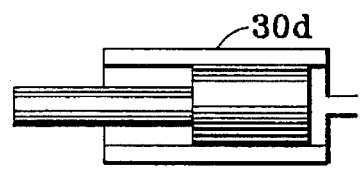

The actuating mechanism may be of any known construction, such as the voice coil actuator 30b, shown in FIG. 2B, the lead screw actuator 30c shown in FIG. 2C, or the pneumatically controlled actuator 30d of FIG. 2D. The servo control 22 is also of known construction and preferably includes an optical sensor such as a video position sensor.

Figure 4:
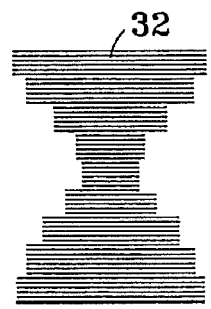
FIG. 4 shows the shape of the portion of a workpiece to be ablated by the apparatus shown in FIG. 3.

FIG. 3 shows the apparatus 20 with the linear actuator assemblies 24 and 26 having individual members 30 inserted into the beam path 18 to create a desired cross-sectional shape for the beam 18. As a result, as shown in FIG. 4, only the portion 32 will be exposed to the ablative action of the beam 18. If video monitors 22 are used the monitors 22 optically monitor the position of the linear members 30, generate signals 23 indicative thereof, and control the position of members 30 in response thereto.

Figure 5:
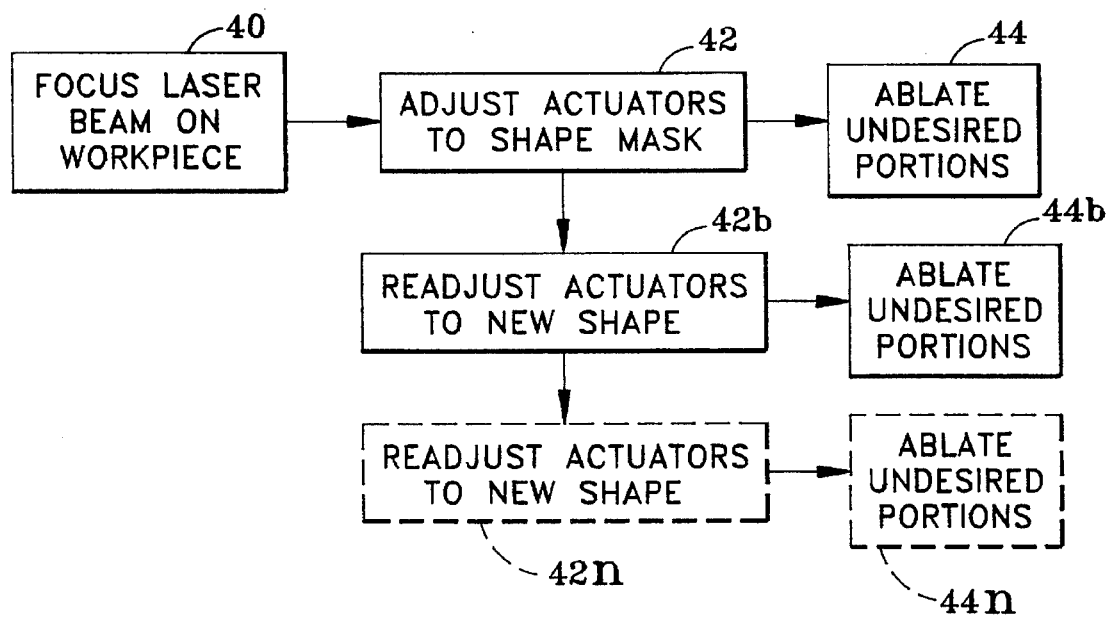
FIG. 5 shows a block diagram of the method of the present invention.

The method of the present invention is shown in FIG. 5 in flow chart form. In step 40 the laser beam 12 is focussed on the workpiece 14. In step 42a, the actuator assemblies 24 and 26 are adjusted to a desired shape to mask the beam 18. In step 44a undesired portions of the workpiece 14 are ablated by the beam 18. This process may be repeated as desired in step 42b by readjusting the actuator assemblies 24 and 26 to a new shape and again ablating the undesired portions of the workpiece in step 44b. This process may be repeated as desired through steps 42n and 44n as shown until all undesired portions of the workpiece 14 are removed without damaging desired portions of the workpiece.

Thus it is clear that the present invention provides an apparatus and method for removing undesired portions of a workpiece without damaging adjacent or underlying portions of the workpiece. The apparatus can be easily adjusted during the removal process to assure that damage to adjacent or underlying portions of the workpiece will be avoided.

While there have been described what are at present considered to be the preferred embodiments of the present invention, it will be obvious to those skilled in the art that various changes and modifications may be made therein, without departing from the invention, and it is, therefore, aimed in the appended claims to cover all such changes and modifications as follow in the true spirit and scope of the present invention.

We claim:

1. A laser ablation tool for removing undesired portions of a workpiece comprising:

means for generating a beam of optical energy having a cross-section including means for directing said beam at said workpiece along a, path;

means in the path of said beam for shaping the cross-section of said beam, said means including first and second linear actuators on opposite sides of said beam path, each of said actuators having a plurality of linear members with each linear member adjacent to and in contact with another of said linear members, and means for individually inserting and retracting each of said members into and out of said beam path a desired distance to thereby shape said beam so as to remove only undesired portions of said workpiece; and a servo control having a position sensor for sensing the position of each of said linear members and an actuator control for controlling the positions of said linear members.

2. A laser ablation tool as set forth in claim 1 wherein said position sensor is an optical sensor.

3. A laser ablation tool as set forth in claim 2 wherein said position sensor is a video sensor.

4. A method of removing undesired portions of a workpiece comprising:.

directing a beam of optical energy at said workpiece along a path;

shaping said beam to a desired cross-sectional configuration by partially interposing a plurality of adjacent linear members into the path of said beam;

utilizing said shaped beam to ablate the undesired portion of said workpiece; and optically monitoring the position of said linear members, generating a signal indicative of said position, and controlling the position of said linear members in response to said signal.

* * * * *